United States Patent
Barsness et al.

(10) Patent No.: US 7,363,617 B2
(45) Date of Patent: Apr. 22, 2008

(54) DATABASE BREAKPOINT APPARATUS AND METHOD

(75) Inventors: Eric Lawrence Barsness, Pine Island, MN (US); Michael Brian Brutman, Rochester, MN (US); Richard Dean Dettinger, Rochester, MN (US); Mahdad Majd, Rochester, MN (US); Brian Edward Olson, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1020 days.

(21) Appl. No.: 10/153,978

(22) Filed: May 23, 2002

(65) Prior Publication Data

US 2003/0221187 A1    Nov. 27, 2003

(51) Int. Cl.
G06F 9/44    (2006.01)
G06F 17/30    (2006.01)

(52) U.S. Cl. .................. 717/129; 717/124; 707/2; 707/4

(58) Field of Classification Search ........ 717/168–178, 717/124, 129, 130; 707/1–206
See application file for complete search history.

(56) References Cited

U.S. PATENT DOCUMENTS

| | | | | |
|---|---|---|---|---|
| 5,822,750 A | * | 10/1998 | Jou et al. | 707/2 |
| 6,006,230 A | * | 12/1999 | Ludwig et al. | 707/10 |
| 6,126,328 A | * | 10/2000 | Mallory et al. | 717/114 |
| 6,601,234 B1 | * | 7/2003 | Bowman-Amuah | 717/108 |
| 6,604,102 B2 | * | 8/2003 | Klein et al. | 707/4 |
| 6,687,704 B1 | * | 2/2004 | Russell | 707/100 |
| 6,795,963 B1 | * | 9/2004 | Andersen et al. | 717/130 |
| 6,839,894 B1 | * | 1/2005 | Joshi et al. | 717/130 |
| 2003/0004671 A1 | * | 1/2003 | Minematsu | 702/123 |
| 2003/0167459 A1 | * | 9/2003 | Bates et al. | 717/125 |

OTHER PUBLICATIONS

Michael L. Powell and Mark A. Linton, "A Database Model of Debugging", ACM, 1983, pp. 67-70.*
H. Bedoya et al., "Using AS/400 Database Monitor and Visual Explain," IBM International Technical Support Organization, Jan. 2001.

* cited by examiner

Primary Examiner—Tuan Dam
Assistant Examiner—Isaac Tecklu
(74) Attorney, Agent, or Firm—Martin & Associates, LLC; Derek P. Martin

(57) ABSTRACT

An apparatus and method define the concept of a "database breakpoint." One or more conditions in the database are specified as a database breakpoint in a debug environment for debugging a computer program that accesses the database. When the database conditions exist, one or more debug functions may be performed with respect to the execution of the computer program. Examples of debug functions include halting execution of the computer program and halting operations to the database by other programs. With both the computer program and database halted, the user may then interrogate the database to determine its state, and may interrogate the program to determine its state. Database breakpoints greatly enhance the utility of a debugger by providing additional conditions for debugging a computer program that accesses a database.

17 Claims, 8 Drawing Sheets

| Database Breakpoints | |
|---|---|
| 1 | Query that causes triggers to be executed |
| 2 | Previously run query gets reoptimized |
| 3 | Query that locks X number of rows |
| 4 | Query that returns more than Y rows |
| 5 | Query where optimizer decides that a temporary index is needed even though an index exists |
| 6 | Programmable thresholds met |
| 7 | Join order is not as expected |
| 8 | Conversion errors occur |
| 9 | Lock timeouts |
| 10 | Insert execution that does not provide a value for a column or that provides null for a column |
| 11 | Column or combination of columns not used in an index |
| 12 | Query that involves a table scan |
| 13 | Query that will return no rows |
| 14 | Update or delete statement that would affect multiple rows in a table |

FIG. 2

DATABASE BREAKPOINT APPARATUS AND METHOD

BACKGROUND OF THE INVENTION

1. Technical Field

This invention generally relates to computer systems, and more specifically relates to apparatus and methods for debugging computer programs.

2. Background Art

Since the dawn of the computer age, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated computer software has evolved to take advantage of the higher performance of the hardware, resulting in computer systems today that are much more powerful than just a few years ago.

As the sophistication and complexity of computer software increase, the more difficult the software is to debug. Debugging is the process of finding problems, or "bugs", during the development of a computer program. Most modem programming environments include a debugger that provides tools for testing and debugging a computer program. Known debuggers allow the user to set one or more breakpoints in the computer program, which are points where the execution of the computer program is stopped so that the state of the program can be examined to verify that the program executed as designed.

Some computer programs store data to and retrieve data from one or more databases. A computer program typically interacts with a database by providing a query. A database manager processes the query, and returns data in the database that matches the query. Because the computer program can only access data in the database via the database manager, the state and condition of the database is not directly controlled by or accessible to the computer program. For this reason, there is currently no way to stop execution of a computer program based on some specified state of the database, or some specified conditions that exist in the database or in the database manager. Without a mechanism and method for halting execution of a computer program based on specified state or conditions in a database, the computer industry will continue to suffer from inefficient methods and tools for debugging computer programs that access databases.

DISCLOSURE OF INVENTION

According to the preferred embodiments, an apparatus and method define the concept of a "database breakpoint." One or more conditions in the database are specified as a database breakpoint in a debug environment for debugging a computer program that accesses the database. When the database conditions exist, one or more debug functions may be performed with respect to the execution of the computer program. Examples of debug functions include halting execution of the computer program and halting operations to the database by other programs. With both the computer program and database halted, the user may then interrogate the database to determine its state, and may interrogate the program to determine its state. Database breakpoints greatly enhance the utility of a debugger by providing additional conditions for debugging a computer program that accesses a database.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 2 is a table that lists sample database breakpoints that are within the scope of the preferred embodiments;

BEST MODE FOR CARRYING OUT THE INVENTION

Figure 1:
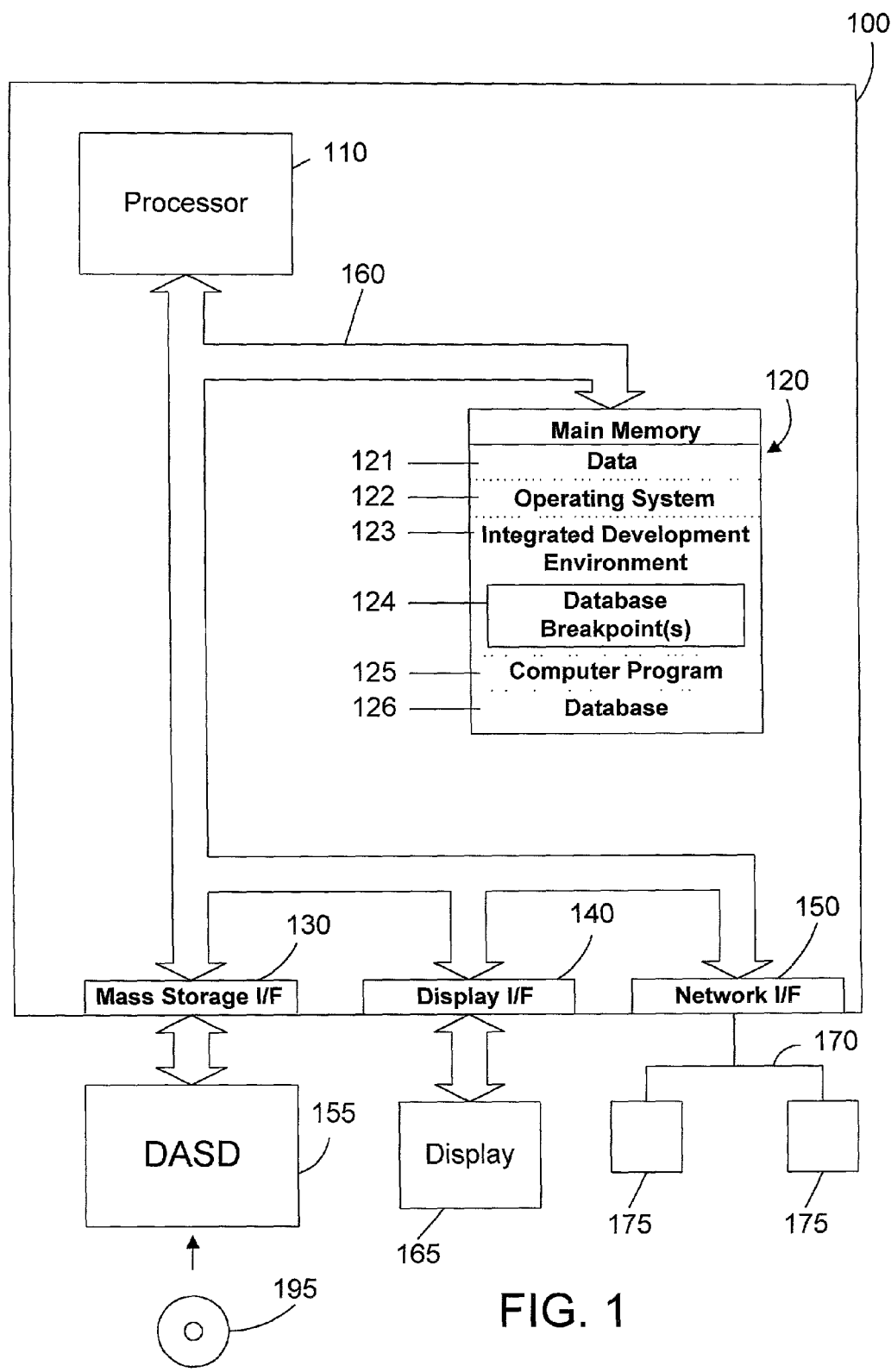
FIG. 1 is a block diagram of an apparatus in accordance with the preferred embodiments.

The present invention is used in a programming environment for developing computer programs. For those who are not familiar with software development techniques, the brief overview below provides background information that will help the reader to understand the present invention.

1. Overview

Modern Programming Environments

Computer programs are constructed using one or more programming languages. Like words written in English, a programming language is used to write a series of statements that have particular meaning to the drafter (i.e., the programmer). The programmer first drafts a computer program in human readable form (called source code) prescribed by the programming language, resulting in a source code instruction (or statement) stream. The programmer then uses mechanisms that change the human readable form of the computer program into a form that can be understood by a computer system (called machine readable form, or object code). These mechanisms are typically called compilers; however, it should be understood that the term "compiler", as used within this specification, generically refers to any mechanism that transforms one representation of a computer program into another representation of that program.

This machine readable form, within this specification, is a stream of binary instructions (i.e., ones and zeros) that make up operational codes (known as op codes) that are meaningful to the computer. The compiler typically compiles each human readable statement into one or more machine readable instructions. Compilers generally translate each human readable statement in the source code instruction stream into one or more intermediate language instructions, which are then converted into corresponding machine-readable instructions. Once the machine-readable instructions have been generated, the computer program may be run on the computer system it was designed for.

Computer programs typically include one or more program variables that contain data of interest. These variables are typically represented by text labels in high-level and intermediate code computer programs. The concept of program variables is well known in the art.

Modern programming environments may provide many different combinations of features. For example, most programming environments include an editor or browser that displays source code to the programmer on a display device. A compiler is used, as explained above, to generate machine code from source code. A linker may also be included to allow sub-portions of the program to be separately compiled and linked together after compilation. Some programming environments include target hardware, which is the hardware on which the computer program is intended to run. Others may provide a simulator in software to "run" the code to simulate how the target hardware would respond to the computer program. Most modern programming environments also provide a debugger to help a programmer to locate problems in a computer program.

Debugging a Computer Program

For a computer program of any complexity, the program will likely not perform exactly as intended due to programmer errors, known as "bugs", in the computer program. To help a programmer locate the bugs in his or her program, most modern programming environments provide a debugger that gives the programmer a variety of different tools for locating bugs. For example, a typical debugger includes a breakpoint capability that stops the execution of the program when a specified event in the computer program occurs. Once the program execution is stopped, the debugger typically allows the programmer to examine memory and status information to determine whether or not the program is in the proper state. A debugger may also allow a programmer to specify conditions and run a "program trace", which writes to memory a list of all events of interest to the programmer without stopping the execution of the code.

Debugging a Computer Program that Accesses a Database

When a computer program accesses a database, performance problems may be caused by dynamic conditions that arise due to several different computer programs adding, updating, and deleting records in the database at the same time. These conditions are very difficult to re-create, making identification of the problem difficult. In the prior art, database performance monitors are known that log database information to a log file that can be later queried. Reading the contents of the log file later may be helpful in identifying some problems, but may not help in identifying the cause of many problems encountered in real time.

Figure 3:
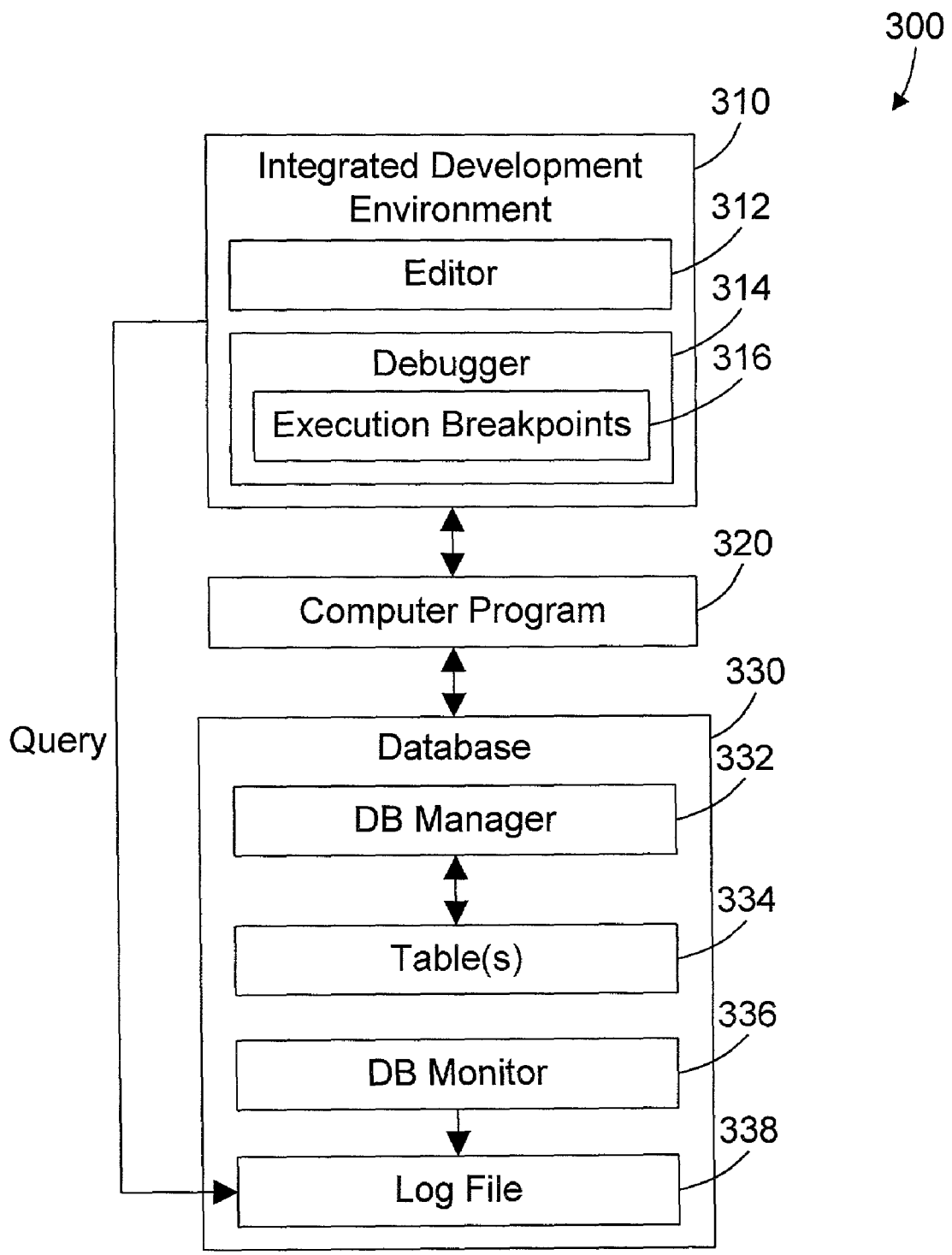
FIG. 3 is a block diagram of a prior art system for debugging a computer program that accesses a database.

An example of a prior art system 300 is shown in FIG. 3. An integrated development environment 310 is provided for generating and debugging a computer program 320. An editor 312 is typically used to allow a human programmer to type instruction statements that make up computer program 320. A debugger 314 is also part of a typical integrated development environment, allowing a human programmer to debug the computer program 320. Using the debugger, the human programmer may define one or more execution breakpoints 316 that define certain conditions relating to the execution of the computer program. One example of a known execution breakpoint is a RunTo breakpoint, which specifies an address, label, or some other identifier in a computer program. The debugger executes the computer program, and halts the execution of the computer program when the specified identifier is encountered. Another example of an execution breakpoint is a register breakpoint that specifies a particular value or mathematical criteria for a register. The debugger executes the computer program, and halts the execution of the computer program when the value in the specified register meets the breakpoint criteria. Other examples of execution breakpoints are known to those skilled in the art.

We assume for this example that computer program 320 accesses a database 330. Database 330 typically includes a database manager 332 that is used to manage data located in one or more tables 334. A database monitor 336 is also known in the art. Database monitor 336 monitors the state of database 330, and writes this information to a log file 338. The log file 338 may then be queried to read its contents. Log file 338 essentially contains a historical log of activity within database 330.

In the prior art system 300 shown in FIG. 3, the execution breakpoints do not allow specifying any database conditions, because the debugger 314 has no way to monitor the conditions within the database 330 in real time. While the log file 338 may be queried by the integrated development environment 310 to view the historical log of activity in the database, there is currently no known way for a debugger to take any action based on conditions in a database. As a result, debugging database problems is very difficult using prior art techniques.

2.0 Detailed Description

The present invention makes debugging of a computer program that accesses a database much easier by providing real-time communication between the debugger and the database, and by providing database breakpoints that allow the debugger to perform one or more debug functions when the conditions in a database breakpoint is satisfied.

Referring to FIG. 1, a computer system 100 is one suitable implementation of an apparatus in accordance with the preferred embodiments of the invention. Computer system 100 is an IBM iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices (such as a direct access storage device 155) to computer system 100. One specific type of direct access storage device 155 is a readable and writable CD ROM drive, which may store data to and read data from a CD ROM 195.

Main memory 120 in accordance with the preferred embodiments contains data 121, an operating system 122, an integrated development environment 123, a computer program 125 and a database 126. Data 121 represents any data that serves as input to or output from any program in computer system 100. Operating system 122 is a multitasking operating system known in the industry as OS/400; however, those skilled in the art will appreciate that the spirit and scope of the present invention is not limited to any one operating system. Integrated development environment 123 is a computer program development environment that preferably integrates together the creation and debugging of a computer program. Note that integrated development environment 123 may include an editor, compiler, linker, and simulator that are not shown in FIG. 1 but that are known in the art to be part of integrated development environments. In the preferred embodiments, integrated development environment 123 allows specifying one or more database breakpoints 124. A database breakpoint 124 is a specification of database conditions or state. When the conditions or state specified in a database breakpoint exist in the database, a debugger within the integrated development environment 123 may perform one or more suitable debug functions. Note that debug functions include halting execution of the computer program 125, and halting all activity to database 126 by other programs. This preserves the computer program 125 and database 126 in their current states when the breakpoint is satisfied, allowing the database to be queried and the state of the computer program 125 to be examined to determine the cause of the problem that triggered the database breakpoint 124. Computer program 125 is any suitable program that accesses a database 126. Database 126 is any suitable database, whether currently known or developed in the future. Database 126 comprises one or more records that contain fields of data.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, integrated development environment 123, computer program 125, and database 126 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable signal bearing media used to actually carry out the distribution. Examples of suitable computer-readable signal bearing media include: recordable type media such as floppy disks and CD ROM (e.g., 195 of FIG. 1), and transmission type media such as digital and analog communications links.

Referring now to FIG. 2, a table of database breakpoints 124 is shown that includes breakpoints that are within the scope of the preferred embodiments. Each database breakpoint 124 specifies conditions or state of the database. When the conditions or state for a breakpoint 124 are satisfied, one or more debug functions may be performed, which may include halting execution of the computer program and halting operations to the database by other programs.

Database breakpoint #1 in FIG. 2 specifies a query that causes triggers to be executed. In many databases, trigger programs may be defined that monitor the state of a database, and that perform certain functions when specified conditions are met. If a query causes a trigger program to be executed, we may want to examine the state of the database, so database breakpoint #1 is provided. Note that database breakpoint #1 could be expanded to include may options, such as whether the main body was executed. Database breakpoint #2 specifies that a previously run query gets reoptimized because of changes. The changes most likely would involve different host variables that would cause the query optimizer to pick a different optimization such as a different join order and the like.

Database breakpoint #3 specifies a query that locks a specified threshold value X or more of rows. Locking rows in a database can cause contention between different processes or programs that need to access the rows, and breaking at the potential contention point may be useful in identifying database problems. Database breakpoint #4 specifies a query that returns more than a specified threshold value Y of rows. If a query returns hundreds or thousands or rows, it is possible that the program is doing something that the database could do easier, like summing values or calculating averages.

Database breakpoint #5 specifies a query where the query optimizer decides that a temporary index is needed even though an index exists. This includes creating indexes from indexes. Database breakpoint #6 specifies programmable thresholds that may be set by the user. Examples of programmable thresholds include a time limit for performing a specified operation, or a specified number of open commitments for a unit of work in the database. Database breakpoint #7 specifies that the join order of elements of a query is not as expected when a query is processed. For example, database breakpoint #7 may break execution of the computer program if the join order of a query is different from the way the query was coded. Database breakpoint #8 specifies that a conversion error has occurred. A conversion error indicates bad data. Examples of conversion errors are when a timestamp record is invalid, and when non-numeric data is in a numeric field.

Database breakpoint #9 specifies that one or more locks timeout. If a database has a lock on a table or record that is held for too long, the lock may time out. For example, if an application begins doing some database work, but never finishes the work with a commit or rollback, the lock on the table or record would time out. Providing a breakpoint when a lock times out allows debugging this particular type of bug in a program. Database breakpoint #10 specifies an insert execution that does not provide a value for a column, or that provides null for a column. Sometimes it is impossible to go back and modify a database to enforce these restrictions, but it may still be an error condition for the current application to provide no value or null for a column.

Database breakpoint #11 specifies a column or combination of columns that are not used in an index. Database breakpoint #12 specifies a query that involves a table scan. One possible option for this type of breakpoint is the size of the file. For example the breakpoint would only be satisfied if more than a specified number of rows exist in the table. Database breakpoint #13 specifies a query that will return no rows. Many scenarios exist where an application always expects exactly one row from a query. When this is the case, returning no data suggests an error condition that should be evaluated more closely. Database breakpoint #14 specifies an update or delete statement that would affect multiple rows in a table.

The specific database breakpoints shown in FIG. 2 are shown by way of example of different database conditions or states that may be used as database breakpoints. Note that other database breakpoints not shown in FIG. 2 may also be specified within the scope of the preferred embodiments, which expressly extend to any specification of database condition or state that may be communicated from the database to the debugger. Note that many of the database breakpoints 124 listed in FIG. 2 may be used to find ways to optimized database or program performance, rather than to locate errors or "bugs" in the computer program 125.

Figure 4:
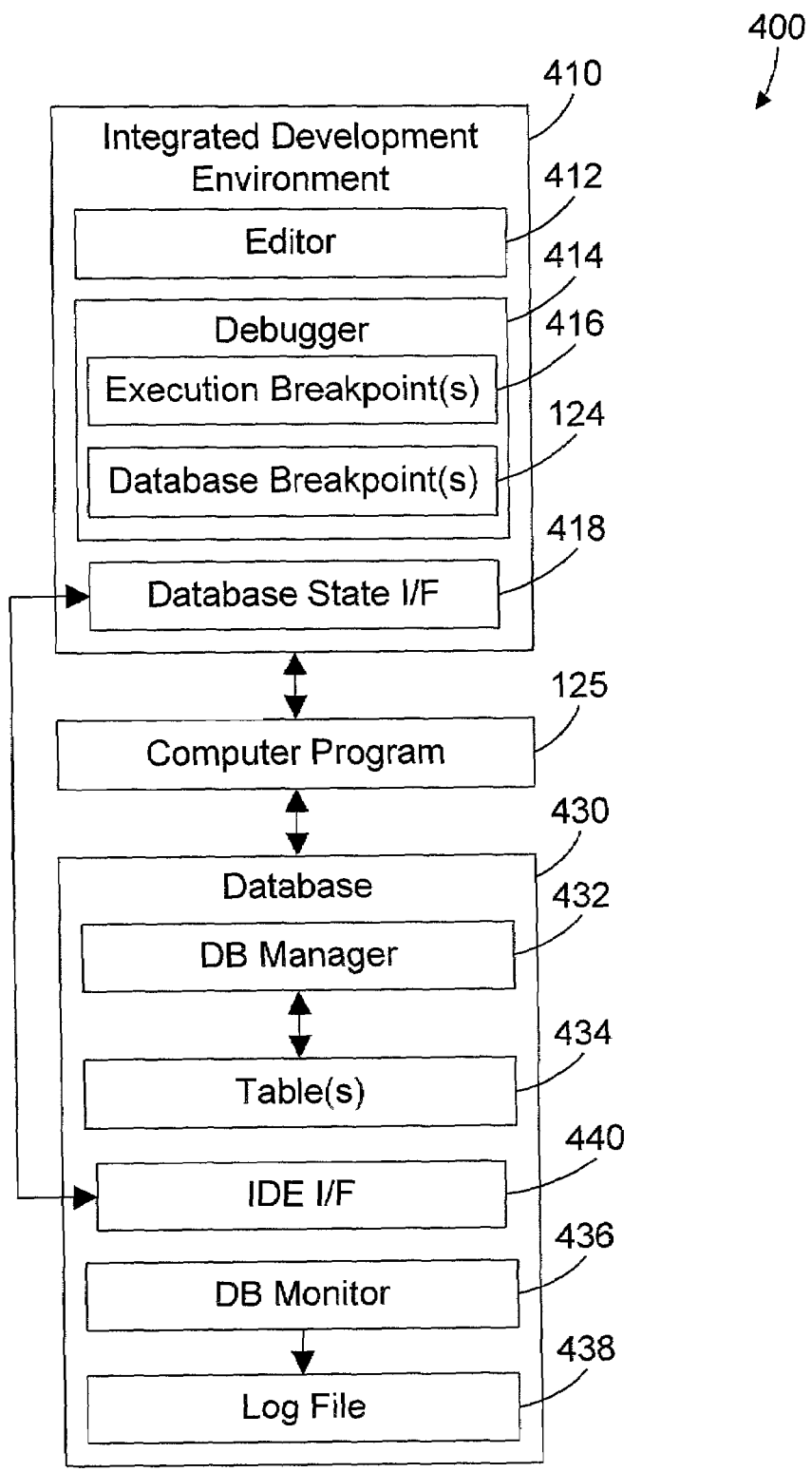
FIG. 4 is a block diagram of a general system in accordance with the preferred embodiments that provides and processes database breakpoints.

Referring now to FIG. 4, a system 400 in accordance with the preferred embodiments includes an integrated development environment 410 that has an editor 412 and a debugger 414 that supports both execution breakpoints 416 and database breakpoints 124. To support database breakpoints 124, there needs to be a way for the debugger 414 and database 430 to communicate in real-time the state or conditions that exist in the database. To accomplish this communication, a database state interface 418 is provided in integrated development environment 410, and a corresponding integrated development environment (IDE) interface 440 is provided in database 430. In this manner the integrated development environment 410 may determine the state of database 430 by information communicated from the database 430 via its IDE interface 440 to the integrated development environment 410 via its database state interface 418. In addition, database 430 preferably includes a database manager 432 that is used to manage data located in one or more tables 434. Database monitor 436 monitors the state of database 430, and writes this information to a log file 438.

FIG. 4 shows a broad representation that is within the scope of the preferred embodiments, which includes database breakpoints 124, an interface 418 within the integrated development environment 410, and a corresponding interface 440 in the database 430. The result is that the human user may define one or more database breakpoints 124, the integrated development environment 410 may monitor the state of the database 430 via information flowing from the IDE interface 440 to the database state interface 418, and the debugger can then perform one or more debug functions when the database conditions specified in a breakpoint exist in the database. Note that there are numerous variations for implementing the general features shown in FIG. 4. Some of these variations are shown in FIGS. 5-7.

Figure 5:
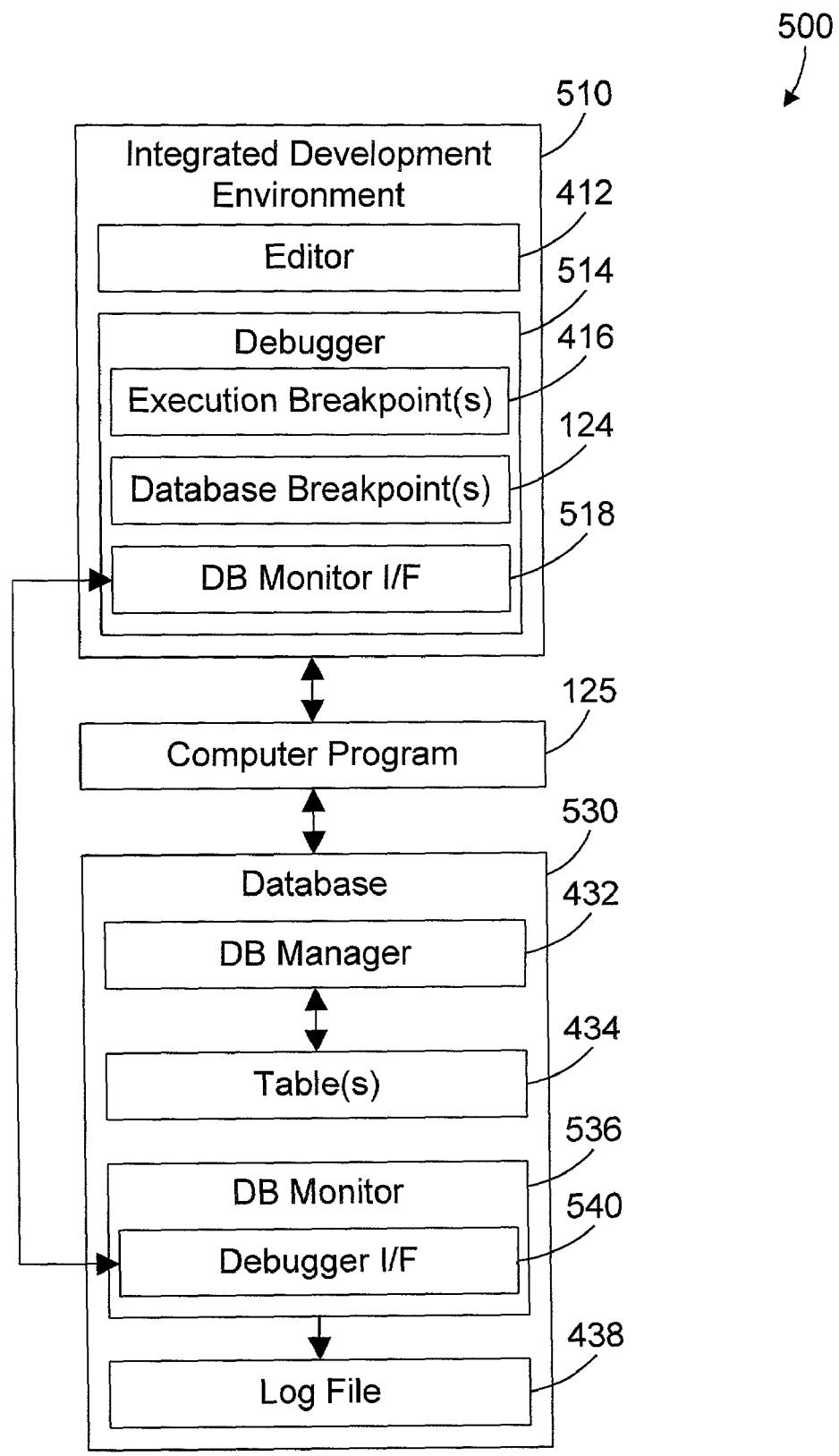
FIG. 5 is a block diagram of a first specific implementation in accordance with the preferred embodiments that provides and processes database breakpoints.

In system 500 of FIG. 5, a debugger interface 540 is provided within the database monitor 536. Because the database monitor 536 logs database state information to the log file 438, adding a debugger interface 540 makes this same information available in real-time to the debugger. Debugger 514 includes a database monitor interface 518 that communicates with the debugger interface 540. In this manner, the database monitor 536 can not only write database state information to the log file 438, but can make this same data available to the debugger 514 as well. The debugger 514 can then determine whether the database state communicated to its database monitor interface 518 satisfies any of the database breakpoints 124. If so, debugger 514 then performs at least one debug function, which may include halting execution of the computer program 125 and halting operations to the database 530 by all other programs.

System 500 of FIG. 5 allows adding the database breakpoint capability of the present invention to an existing IBM iSeries computer system with minimal work, because most of the database state information is already available in the database monitor 536. System 500 is suitable for performing database breakpoint #s 1-9 in FIG. 2.

Figure 6:
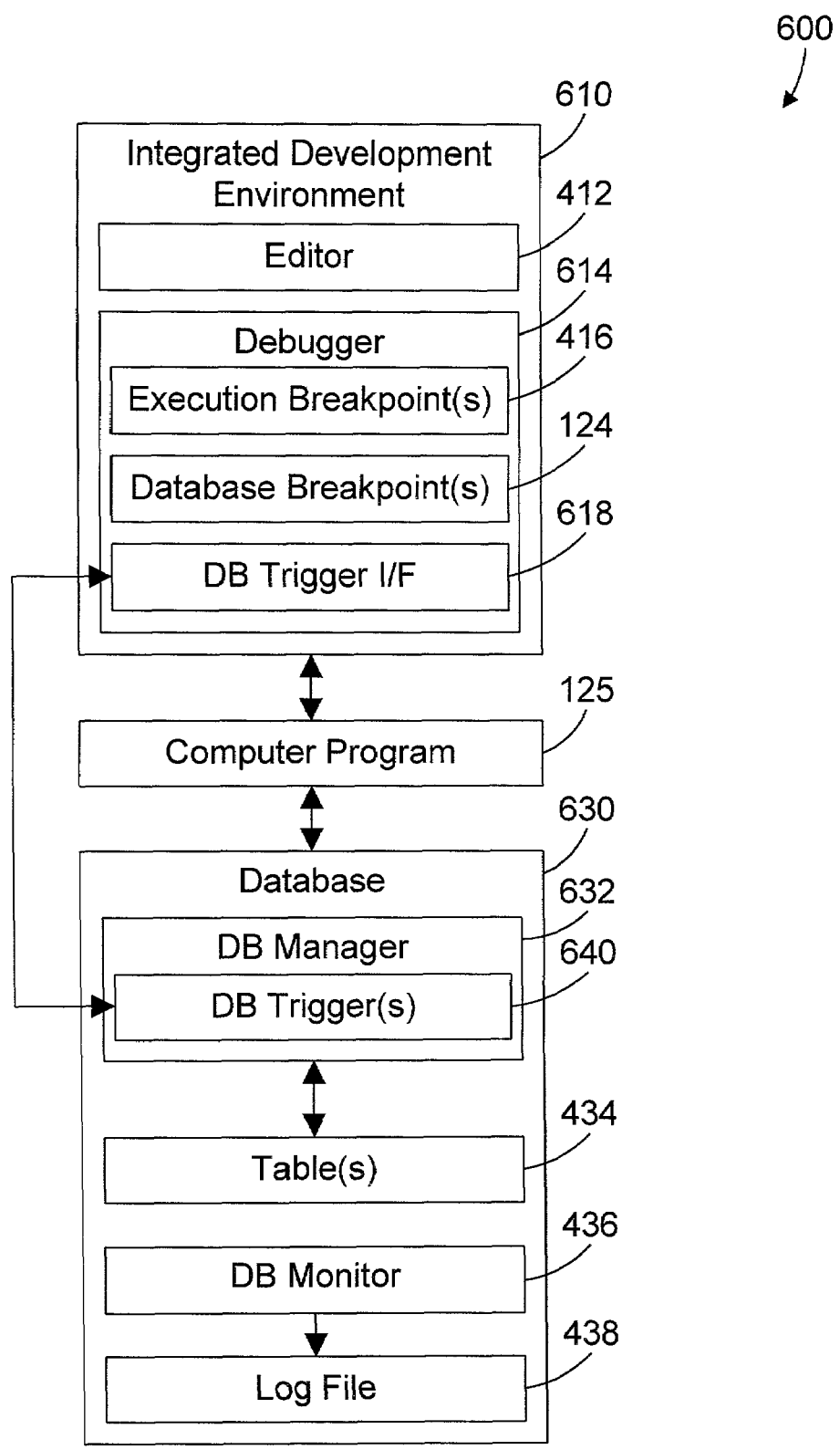
FIG. 6 is a block diagram of a second specific implementation in accordance with the preferred embodiments that provides and processes database breakpoints.
Figure 7:
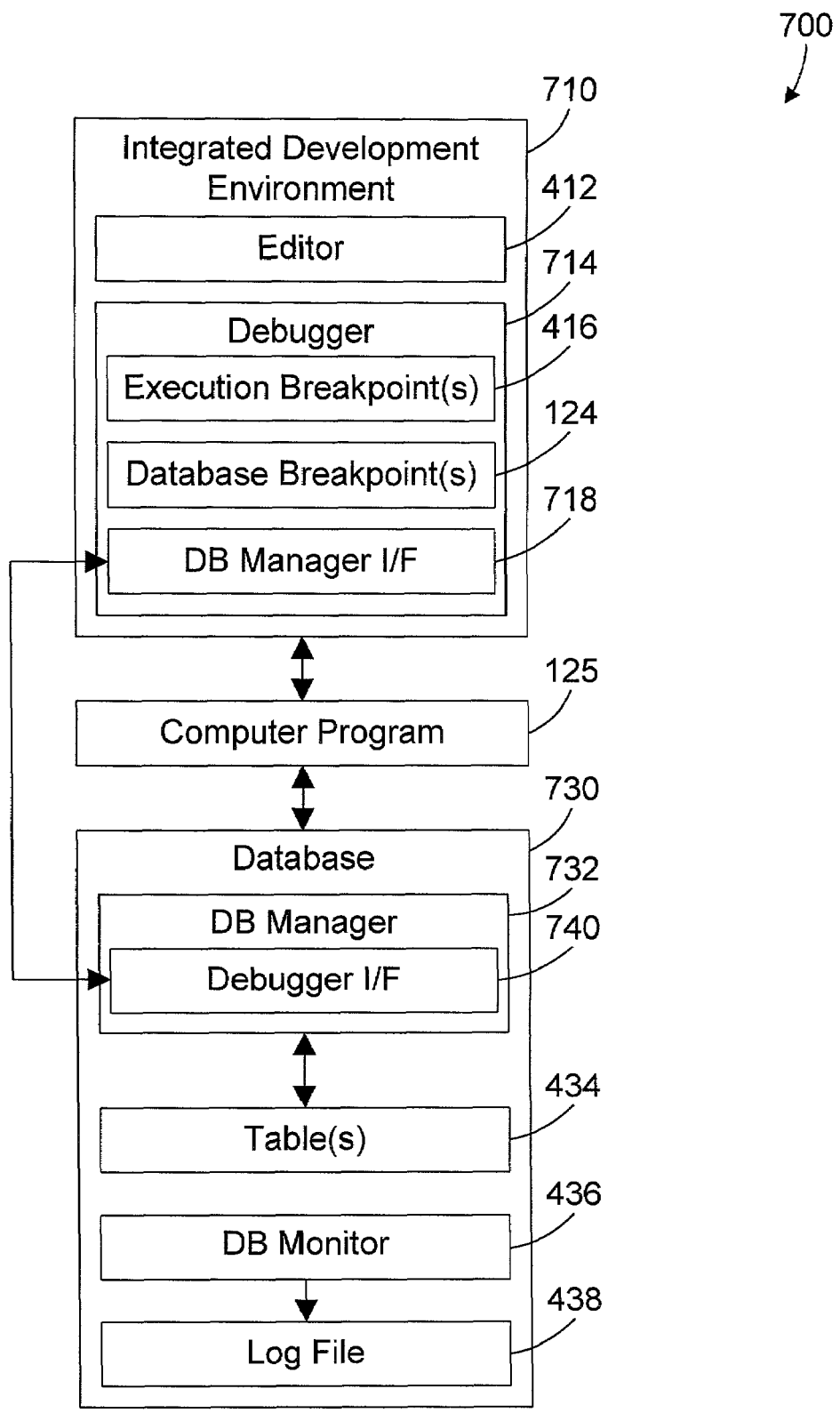
FIG. 7 is a block diagram of a third specific implementation in accordance with the preferred embodiments that provides and processes database breakpoints.

Another way to provide the database breakpoint capability of the present invention is shown in system 600 of FIG. 6. System 600 has a database 630 that has a database manager 632 that includes one or more database triggers 640. These database triggers 640 are programs that are executed when certain conditions in the database are met, and include the logic to communicate with database trigger interface 618 in debugger 614. In this manner, debugger 614 may use information received from database triggers 640 to determine the state of the database, and to determine if the conditions specified in any of the database breakpoints 124 are satisfied. Note that system 600 of FIG. 6 is suitable for performing database breakpoints #10 and #11 in FIG. 2.

Still another way to provide the database breakpoint capability of the present invention is shown in system 700 of FIG. 7. System 700 has a database 730 that has a database manager 732 that includes a debugger interface 740. The database manager 732 may communicate information regarding the state of the database 730 to debugger 714 via its debugger interface 740. Debugger 714 may use information received from database manager 732 to determine the state of the database, and to determine if the conditions specified in any of the database breakpoints 124 are satisfied. Note that system 700 of FIG. 7 is suitable for performing database breakpoints #s 12-14 in FIG. 2.

One skilled in the art will appreciate that the features of systems 500, 600 and 700 shown in FIGS. 5-7, respectively, may be added to each other to arrive at a system that supports more database breakpoints than any of the single systems. This includes combining the features of all three systems to arrive at a system that supports all of the database breakpoints shown in FIG. 2, as well as supporting other database breakpoints not specifically mentioned herein.

Figure 8:
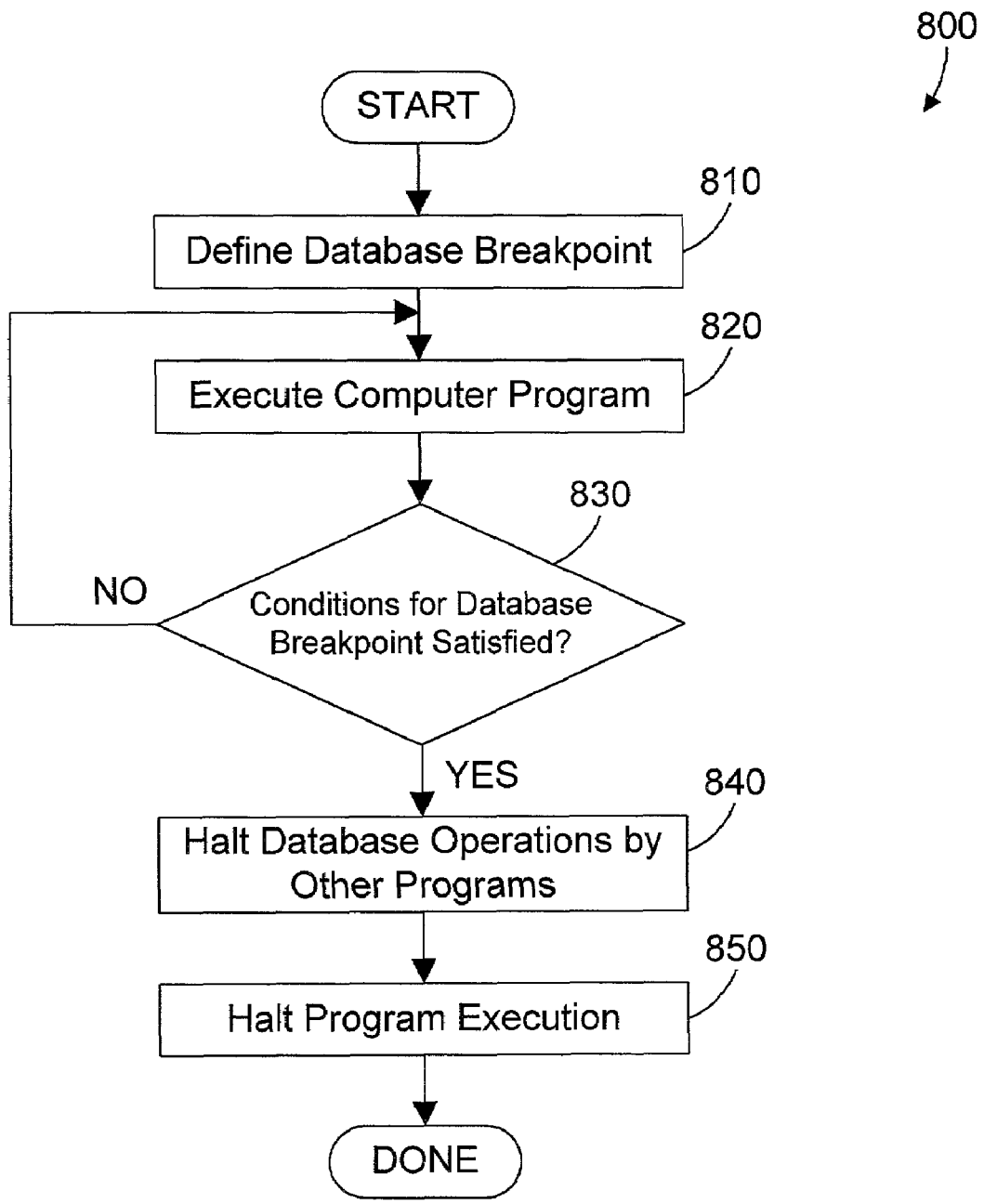
FIG. 8 is a flow diagram of a method for defining and processing database breakpoints within the scope of the preferred embodiments.

Referring now to FIG. 8, a method 800 in accordance with the preferred embodiments begins by defining a database breakpoint (step 810). As stated above, a database breakpoint is simply a specification of some condition or state in a database. Some examples of database breakpoints are shown in FIG. 2. Once one or more database breakpoints have been defined, the computer program that accesses the database is executed (step 820). As the computer program executes, the debugger monitors the state of the database in real time. If the conditions for no database breakpoint are satisfied (step 830=NO), execution of the computer program continues (step 820). When conditions for a database breakpoint are satisfied (step 830=YES), the debugger may then perform any suitable debug function. Examples of two suitable debug functions are shown in FIG. 8 to include halting database operations by other programs (step 840) and halting execution of the computer program (step 850). With the program and database both halted, the human programmer can then determine the state of the computer program and the state of the database to more easily isolate and identify problems or performance issues that may exist in the computer program or in the database as the computer program runs.

The preferred embodiments greatly enhances the debug capability known in the art by adding the capability of defining database breakpoints in a debugger. An interface is provided for communicating real-time database state information from the database to the debugger. If the conditions specified by a database breakpoint exist in the database, the debugger can then perform any appropriate debug function, including the halting of the computer program and halting operations to the database by other programs.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. A method for debugging a computer program that accesses a database, the method comprising the steps of:
   defining at least one database breakpoint that specifies at least one database condition;
   executing the computer program; and
   when the at least one database condition exists, halting operations by other programs to the database and halting execution of the computer program.

2. The method of claim 1 wherein the at least one database condition includes processing a query that causes at least one trigger program to be executed.

3. The method of claim 1 wherein the at least one database condition includes reoptimizing a previously run query.

4. The method of claim 1 wherein the at least one database condition includes processing a query that locks more than a predetermined number of rows in the database.

5. The method of claim 1 wherein the at least one database condition includes processing a query where a query optimizer determines that a temporary index is needed even though an index already exists.

6. The method of claim 1 wherein the at least one database condition includes satisfying at least one programmable threshold in the database.

7. The method of claim 6 wherein the at least one programmable threshold includes at least one time limit for performing a specified operation.

8. The method of claim 6 wherein the at least one programmable threshold includes a specified number of open commitments for a unit of work in the database.

9. The method of claim 1 wherein the at least one database condition includes detecting when a join order is not as expected.

10. The method of claim 1 wherein the at least one database condition includes an error in conversion in the database.

11. The method of claim 1 wherein the at least one database condition includes at least one timeout of at least one lock in the database.

12. The method of claim 1 wherein the at least one database condition includes an insert execution that does not provide a value for a column or that provides null for a column.

13. The method of claim 1 wherein the at least one database condition includes a column or combination of columns not used in an index.

14. The method of claim 1 wherein the at least one database condition includes the processing of a query that involves a table scan.

15. The method of claim 1 wherein the at least one database condition includes the processing of a query that will return no rows.

16. The method of claim 1 wherein the at least one database condition includes the processing of an update or delete statement that would affect multiple rows in a table.

17. A method for debugging a computer program that accesses a database, the method comprising the steps of:
   defining in a debugger at least one database breakpoint that specifies at least one database condition;
   executing the computer program under control of the debugger;
   the database communicating to the debugger data that indicates the state of the database; and
   when the state of the database indicates the at least one database condition exists in the database, performing at least one debug function for debugging the computer program, wherein the at least one debug function includes halting operations by other programs to the database and halting execution of the computer program.

* * * * *